Figure 1:
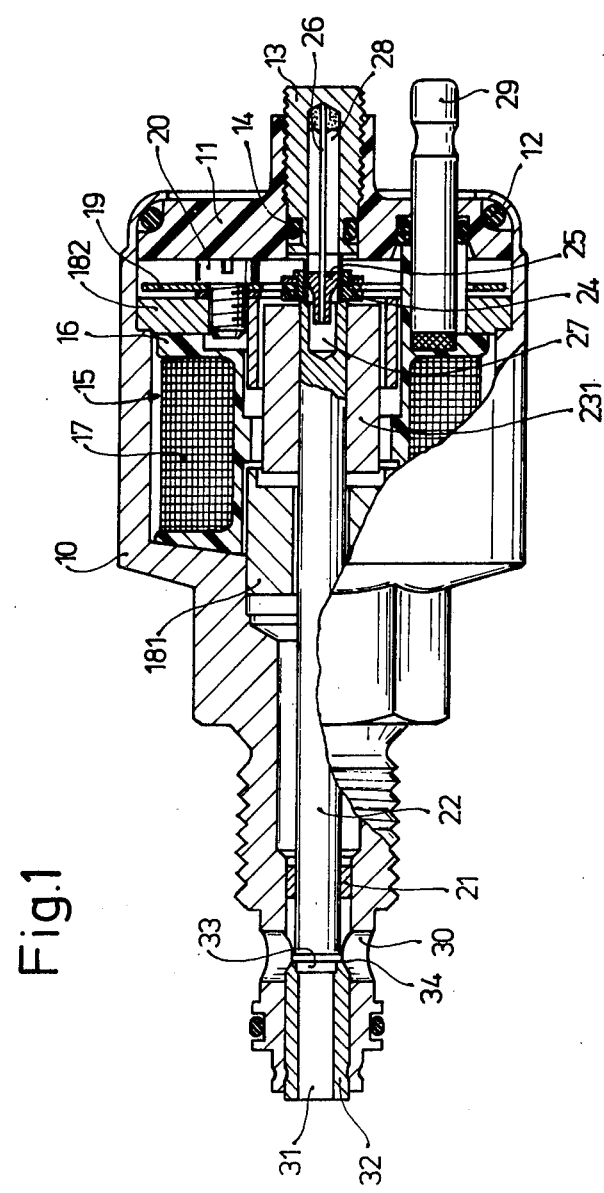

United States Patent [19]

Schlagmüller et al.

[11] 4,157,168
[45] Jun. 5, 1979

[54] ELECTROMAGNETICALLY OPERATED VALVE STRUCTURE

[75] Inventors: Walter Schlagmüller, Schwieberdingen; Rudolf Babitzka, Kirchberg, both of Fed. Rep. of Germany

[73] Assignee: Robert Bosch GmbH, Stuttgart, Fed. Rep. of Germany

[21] Appl. No.: 853,265

[22] Filed: Nov. 21, 1977

[30] Foreign Application Priority Data

Dec. 24, 1976 [DE] Fed. Rep. of Germany ....... 2658969

[51] Int. Cl.² .................. F16K 31/06; F16K 47/08
[52] U.S. Cl. ................................. 251/52; 251/129
[58] Field of Search ........................ 251/129, 52, 54

[56] References Cited

U.S. PATENT DOCUMENTS 3,446,471  5/1969  Westphal ........................ 251/52

FOREIGN PATENT DOCUMENTS 1136175  9/1962  Fed. Rep. of Germany ............. 251/54
2361591  6/1975  Fed. Rep. of Germany.

Primary Examiner—Arnold Rosenthal
Attorney, Agent, or Firm—Frishauf, Holtz, Goodman, Woodward

[57] ABSTRACT

To suppress spurious oscillations of a membrane-suspended plunger forming a valve body cooperating with the valve seat, the plunger is formed with a blind bore into which a small piston extends, with slight clearance, the bore and piston forming a damping cylinder-piston arrangement which includes additionally a damping fluid so that, upon movement of the plunger as the consequence of energization of a solenoid, the damping cylinder-piston system will suppress such oscillations while still permitting positive movement of the plunger and hence seating the operation of the valve with minimum force due to the membrane suspension thereof.

19 Claims, 2 Drawing Figures

ELECTROMAGNETICALLY OPERATED VALVE STRUCTURE

Reference to related prior art:

German Disclosure Document DT-OS 23 61 591.

The present invention relates to an electromagnetically operated valve structure, and more particularly to a pressure control valve in which a magnetically reciprocatable plunger controls opening, or closing, respectively, that is, fluid communication, between inlet and outlet openings formed in a valve body, and in which the plunger is suspended by a membrane.

Background and Prior Art:

It has previously been proposed to control the working pressure of a fluid medium, typically a hydraulic fluid medium, by electromagnetically operated valves. Specifically, automatic gear shifting in automotive vehicle automatic transmissions requires matching of the working pressure of a hydraulic fluid, or various other pressure relations to the torque of a drive motor. The match of the working pressure is controlled by a control signal or parameter. In a preferred form, the control signal is provided as an electrical control signal. Mechanical control of pressures has the disadvantage that control rods or control elements are subject to feedback from the controlled hydraulic circuit. Magnetic valves, however, can control hydraulic pressures as a function of electrical signals which, themselves, can be generated by inductive transducers. Control of the hydraulic pressure then can be effected without feedback of the controlled quantity on the controlling signal.

A valve structure has previously been proposed—see, for example, German Disclosure Document DT-OS 23 61 591—in which a valve plunger or rod is reciprocated under electromagnetic force, generated by a solenoid, the plunger or rod being suspended at one end by a membrane. The other end of the plunger or rod is guided in a slide bearing. Suspending such a plunger at one end on a membrane transfers only small radial forces thereto, so that the heat and friction losses in the slide bearing will become a minimum. It has been found, however, that under certain conditions, and particularly upon rapid switching of the pressure, the plunger may be subjected to axial oscillations or vibrations which are uncontrolled and undesired. This effect, the vibrations or oscillations of the plunger, interferes with proper operation of the hydraulic circuit in which the valve is included and prevent use of such a pressure regulating valve for many applications.

The Invention

It is an object to improve a membrane-suspended electromagnetically operating valve structure so that its use can be extended to many different applications by suppressing the tendency of the plunger or valve operating element to vibrate or oscillate axially.

Briefly, a damping cylinder-piston system is operatively associated with the valve operating plunger or rod formed, in a preferred form, by a blind bore in the plunger into which, with slight clearance, a piston is fitted which is, in turn, secured or suspended from the housing. The region in which the piston-cylinder system operates contains a damping fluid.

In a preferred form of the invention, the piston of the cylinder-piston system is made of a material having a high thermal coefficient of expansion, preferably aluminum, and the cylinder, that is, the plunger in which the bore is formed, is made of a material with a low thermal coefficient of expansion, preferably brass. This construction renders the damping characteristics of the cylinder-piston system essentially temperature independent if the damping fluid is a liquid, since the gap between the piston and cylinder will increase with decreasing temperature, due to contraction of the piston, compensating thereby for an increase in viscosity of the damping liquid. In accordance with another preferred embodiment of the invention, the opening of the inlet bore which is to be closed by the plunger is so constructed that it forms a hydraulic orifice so that the control characteristics of the pressure valve will become essentially independent of the viscosity of the controlled working medium.

Figure 2:
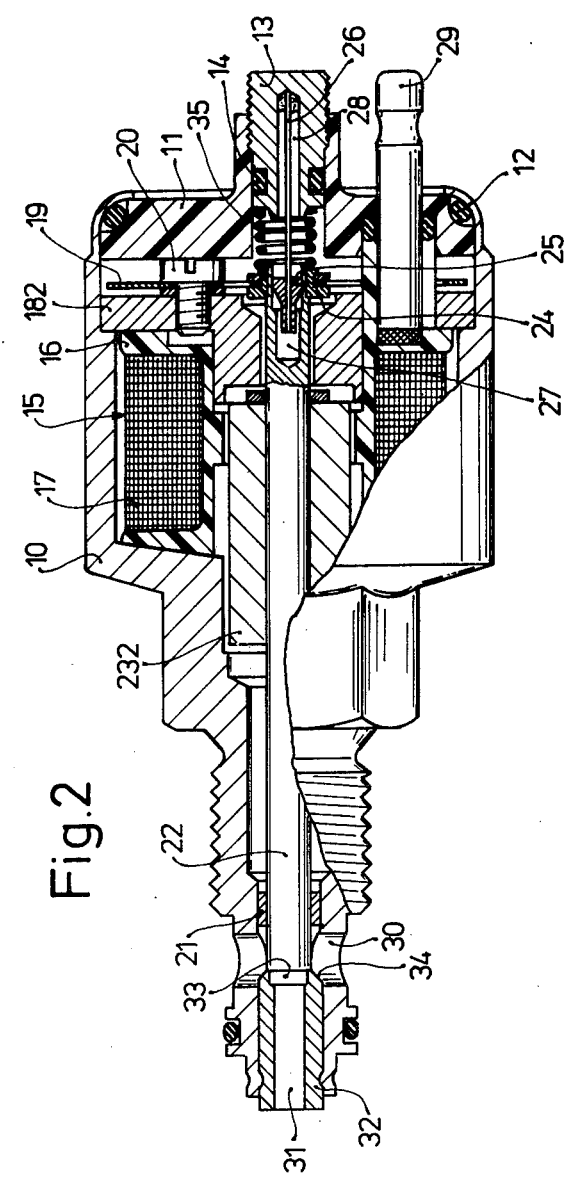

Drawings, illustrating an example:

FIG. 1 is a schematic longitudinal sectional view, with a portion of the structure not sectionalized to show the outer configuration of the structure; and FIG. 2 is a view similar to FIG. 1, in which the valve is an opening-type valve, that is, in which fluid communication is established upon energization of the solenoid.

Referring to FIG. 1: A valve housing 10, which is rotation-symmetrical and an essentially cylindrical pot, is closed off by a circular cover disk 11. Cover disk 11 is preferably made of plastic and, in an especially preferred form, of a polyamide plastic. It is sealed by a first sealing ring 12. A threaded bolt 13 extends through the cover 11 at the center thereof. Bolt 13 is sealed against the outside by a second sealing ring 14. The cover 11 is held in the housing body 10 by bending-over the housing shell to form an internally extending bead. The housing 10, closed off by cover 11, is hollow and retains therein a positioning magnet structure 15 which includes a coil form 16, a solenoid coil winding 17 and two half-yokes 181, 182. The magnet 15 is energized over two current supply terminals 29, only one of which is seen in the drawings. A screw 20 is screwed into the half-yoke 182, to support an essentially circular spring membrane 19. A holder 24, located in the center of the spring membrane 19, is provided to attach a plunger or rod 22 to the spring membrane 19. The plunger or rod 22 forms a valve-operating element. The other end of the plunger or rod 22 is journalled in a slide bearing 21. The end of the plunger 22 adjacent the slide bearing extends into a fluid outlet 30 and, through the fluid outlet 30, to the bore 31 of a bushing 32, secured in the housing.

The plunger 22 carries an armature 231 which fits partially into a recess formed in the half-yoke 181.

In accordance with the invention, a cylinder-piston damping arrangement is provided which is formed by a blind bore 27 in the end portion of the plunger 22 which is held by the spring membrane 19. A piston 25 is fitted into the blind bore 28, or at least into a portion thereof. The bolt 13 extending outwardly of the housing is formed with a second blind bore 28, at the inner end of which a wire 26 is attached which retains the piston 25 in the blind bore 27 of the plunger 22. A damping fluid is located in the piston-cylinder arrangement formed by the blind bore 27 and the piston 25, as well as in the surrounding portions of the structure within the housing. Preferably, the damping fluid is a hydraulic viscous fluid. A suitable damping fluid is the same hydraulic liquid which is switched by the plunger, e.g. automatic automotive transmission fluid, or oil.

Operation:

FIG. 1 illustrates the valve in partially open condition which, upon full energization of the magnet 15, would close completely. In quiescent state, that is, when magnet 15 is entirely de-energized, the valve is open. In that condition, fluid communication extends between the inlet 31 and outlet 30. The plunger is in a position far to the right of FIG. 1 and away from the bushing 32. Working fluid can thus flow through the inlet 31 into outlet 30; the valve is open. Upon energization of magnet 15, the armature 231 surrounding the plunger 22 moves towards the half-yoke 181 until plunger 22 engages the facing end surface 34 of bushing 32. If the end face of plunger 22 is greater than the opening 33 of the inlet bore 31, flow of working medium from the inlet 31 to the outlet 30 is interrupted; the valve is closed.

In accordance with the invention, reciprocating movement of the plunger 22 is hydraulically damped by the cylinder-piston arrangement 25, 27. Piston 25, fixedly held by the wire 26 in the housing of the valve, must move within the blind bore 27 forming the cylinder of the damping system. The damping influence of the cylinder-piston system 25, 27 on the plunger 22 is so selected that it only slightly affects the switching condition of the pressure regulating valve, but effectively suppresses the tendency to oscillations or spurious vibration of the plunger 22. The piston 25 is secured by the wire 26 at the bottom of the second bore 28 in the bolt 13, for example by an adhesive. Hardly any radial forces are transmitted from the piston 25 to the plunger 22. Such radial forces may arise if the plunger 22 is not perfectly centered in the pressure valve structure and thus may be subjected to deflection, upon energization of the magnet, which is not exactly in axial direction.

The gap between the damping piston 25 and the inner wall of the cylinder bore 27 is very small. For a fluid medium as aforesaid, a gap of about 0.03 mm is suitable.

In accordance with a feature of the invention, the damping characteristics of the piston-cylinder system 25/27 can be made essentially temperature independent by constructing the damping cylinder 25 of a material which has a large thermal coefficient of expansion, for example aluminum. In contrast, the plunger 22 is made of a material which has a small thermal coefficient of expansion, for example brass. Upon decrease of temperature, which increases the viscosity of the working fluid in the cylinder portion 27 of the system, the gap between the cylinder bore 27 and the piston 25 will increase, thus compensating for increase in viscosity. The above-given dimension of the gap is for approximately room temperature, that is, about 18°–22° C. This gap determines the damping characteristics of the piston-cylinder system 25/27.

The valve can operate not only as a two-position ON-OFF valve; it can also operate in accordance with a force-pressure characteristic, in which the pressure to be controlled is determined by the cross section of the opening through which the working fluid can escape between the opening 33 of the bushing 32 and the end face of the plunger 22. If the diameter of the end face of the plunger 22 is very much larger than the diameter of the opening 33, then a hydraulic choke effect will result, and the flow resistance will be highly dependent on the viscosity of the working medium to be controlled. To prevent such operating dependency on the viscosity, the diameter of the end face of the plunger 22 is selected to be only slightly greater than the diameter of the opening 33, and the end face 34 of the bushing 32 is tapered or conically inclined so that, upon closing of the valve, the plunger 22 engages the bushing 32 along a ring-shaped edge. This structure results in a hydraulic orifice, the flow resistance of which is essentially independent on the viscosity of the working medium.

The working or operating point of the valve can be adjusted by rotating the bolt 13 to thereby set the axial zero point of the plunger 22. The cover 11 of the valve housing is preferably made of a polyamide, although it may be made of other plastic materials. The bolt 13 can then be formed with a self-tapping thread so that, upon insertion of the bolt 13 through the cover 11, it will retain its position in the cover 11 to form a self-holding seat by plastic deformation of the material of the cover 11. The working range of the pressure valve can be adjusted by axially sliding the bushing 32 in the housing 10, and then securing the bushing in position by circumferential deformation. Bushing 32 can also be formed with a screw thread for rotary adjustment in the housing 10. Axial adjustment of the bushing 32 adjusts the pressure-force characteristics of the valve. This characteristic, usually, follow a hyperbolic curve. The valve can be linearized by suitably shaping the half-yoke 181. This yoke, in combination with the armature 231, operates as a combined surface armature-insertion armature and thus has characteristics which, by suitable shaping of the respective surfaces which are brought in magnetic communication or relationship with each other, can compensate for non-linearities of the hydraulic characteristics. Thus, by suitably matching the magnetic characteristics of the armature 231 and of the yoke 181 and of the hydraulic characteristics of the flow opening upon axial shift of plunger 22, various types of flow-force characteristics can be obtained, including essentially linear flow-force characteristics, with the optimum working point being adjusted by axial adjustment of the bushing 32.

The structure of FIG. 2 is similar to that of FIG. 1, and like elements have been given like reference numerals and will not be explained again. It is arranged to form an opening valve, that is, to open fluid communication between the inlet 31 and the outlet 30 upon energization of the magnet 15. Only a single half-yoke 182 is needed, cooperating with an enlarged armature 232. A helical spring 35 is located between the bolt 13 and the plunger 22 to press the plunger 22, in quiescent condition of the valve, against opening 33 of the bushing 32. Upon energization of the magnet 15, armature 232 will move towards the yoke 182, thus opening fluid communication from the inlet bore 31 to the outlet 30 through the bore 33 of bushing 32. The zero-point of operation, that is, the working point of the plunger can be adjusted by rotation of bolt 13 and/or axial shift of the bushing 32, as in the embodiment of FIG. 1.

The medium to be switched, preferably, is a viscous fluid which usually is the same as the fluid being switched or valved by the unit between the inlet and outlet ports 31, 33. When first installing the unit in a liquid fluid circuit, the valve is filled with the fluid medium. In further operation, there will be fluid communication between the medium to be valved and the medium within the damping cylinder-piston combination. The plunger 22 is movably journalled and thus the medium to be switched or valved can reach the damping fluid system from the fluid circuit which is being valved. In a typical use for the valve, in an automotive automatic transmission, the fluid to be switched will be the transmission fluid, which is an oil, used in the automatic transmission. In other applications, the fluid which is being valved or switched by the valve unit will be that which is also used in the damping cylinder-piston system.

Various changes and modifications may be made, and features described in connection with any one of the embodiments may be used with any of the others, within the scope of the inventive concept.

We claim:

1. Electromagnetically operated valve structure having
   a hollow housing (10, 11) defining a chamber therein;
   a solenoid coil (15) in said chamber;
   a reciprocating plunger (22) in said chamber;
   an armature (231, 232) carried by said plunger (22) and in magnetically coupled relation to said solenoid coil for reciprocation of said plunger in dependence on energization of said coil;
   a slide bearing (21) in said housing, guiding and supporting said plunger (22) for reciprocation, and having an axial dimension which is short with respect to the length of the plunger, and located adjacent one end thereof;
   a membrane (19) secured in said housing and extending transversely of said plunger (22) and supporting said plunger adjacent the other end thereof;
   fluid inlet means (31, 32) and fluid outlet means (33) formed in said housing;
   and a valve seat (34) between said fluid inlet means and said fluid outlet means, the plunger (22) extending towards the valve seat and controlling fluid communication between said inlet and outlet means,
   and comprising, in accordance with the invention,
   a damping piston (25) - cylinder (27) system (25, 27) operatively associated with said plunger (22) and said housing and including a blind bore formed in said plunger extending in the direction of reciprocating movement thereof and forming said cylinder, and a piston (27) secured to said housing and fitting into said bore, with slight clearance;
   and a damping fluid in at least the portion of the housing adjacent the cylinder-piston system.

2. Structure according to claim 1, wherein the housing (10) is formed with a second blind bore, in axial alignment with said piston (25);
   and an elongated filamentary element (26) is secured at the bottom of said blind bore at one end thereof, and attached to the piston with the other end to thereby attach the piston to the housing.

3. Structure according to claim 2, further comprising an axially adjustable element (13) located in axial alignment with said piston (25), said second blind bore (28) being formed in said axially adjustable element, to permit axial longitudinal adjustment of said piston (25) within said cylinder (27).

4. Structure according to claim 3, wherein said housing (10) includes a portion of elastic material, said axially adjustable element (13) being screwed into said elastic material, whereby the axial screw adjustment of said element in said housing is self-holding.

5. Structure according to claim 4, wherein the portion of said housing is made of a polyamide plastic.

6. Structure according to claim 1, wherein the piston is made of a material having a high thermal coefficient of expansion and at least the portion of the plunger (22) in which said blind bore forming the cylinder is located is made of a material having a low thermal coefficient of expansion.

7. Structure according to claim 6, wherein said piston is aluminum, and the portion of the plunger adjacent the piston, and forming the cylinder, is brass.

8. Structure according to claim 5, wherein said piston is aluminum, and the portion of the plunger adjacent the piston, and forming the cylinder, is brass.

9. Structure according to claim 1, further comprising a yoke (181, 182) in magnetically coupled relation with said solenoid (15), the armature (231) associated with said plunger (22), upon energization of the solenoid coil (15), being moved by magnetic force acting on said armature in a direction to close fluid communication between said fluid inlet means (31, 32) and said fluid outlet means (33).

10. Structure according to claim 1, further comprising a yoke (181, 182) in magnetically coupled relation with said solenoid (15);
    spring means (35) biassing the plunger to close or interrupt fluid communication between said fluid inlet means (31, 32) and the fluid outlet means (33), the armature (231) associated with said plunger (22), upon energization of said solenoid coil (15), being moved in a direction counter said bias force and to open or establish fluid communication between said inlet and outlet means.

11. Structure according to claim 1, wherein one of said fluid connection means forming the fluid inlet means and the fluid outlet means comprises a bushing (32) in axial alignment with said plunger, the end portion of said bushing and of said plunger, respectively, forming cooperating valve seat and valve means.

12. Structure according to claim 11, wherein the bushing (32) is essentially cylindrical and has an axial bore, and the end portion of the bore of the bushing, facing the plunger, has a diameter which is large with respect to that of the remainder of the bore.

13. Structure according to claim 12, wherein the face portion (34) of the bushing (32), and facing the end portion of the plunger, is tapered.

14. Structure according to claim 11, wherein the bushing (32) is axially adjustably mounted in the housing (10).

15. Structure according to claim 1, further comprising a yoke (181, 182) in magnetically coupled relation with said solenoid (15), the armature (231) being secured to said plunger, at least a portion of the yoke being formed with a recess to receive the armature (231) secured to the plunger.

16. Structure according to claim 1, wherein the damping fluid is a liquid.

17. Structure according to claim 8, wherein the damping fluid is a liquid.

18. Structure according to claim 17, wherein the damping fluid is automotive automatic trnsmission fluid.

19. Structure according to claim 1, wherein the damping fluid is the same fluid as that which is valved through said fluid inlet and outlet means (31, 32; 33).

* * * * *